(12) United States Patent
Beyer et al.

(10) Patent No.: US 8,564,420 B2
(45) Date of Patent: Oct. 22, 2013

(54) CONTROL MODULE WITH CONNECTION DEVICES FOR CONNECTION TO CONNECTION TERMINALS OF A LOAD FEEDER AND LOAD FEEDER

(75) Inventors: Stefan Beyer, Ebermannsdorf (DE); Klaus Pfitzner, Amberg (DE); Wolfgang Schatz, Amberg (DE); Andreas Thomas, Erlangen (DE)

(73) Assignee: Siemens Aktiengesellschaft, Munich (DE)

( * ) Notice: Subject to any disclaimer, the term of this patent is extended or adjusted under 35 U.S.C. 154(b) by 437 days.

(21) Appl. No.: 12/935,109

(22) PCT Filed: Mar. 20, 2009

(86) PCT No.: PCT/EP2009/053305
§ 371 (c)(1),
(2), (4) Date: Sep. 28, 2010

(87) PCT Pub. No.: WO2009/121729
PCT Pub. Date: Oct. 8, 2009

(65) Prior Publication Data
US 2011/0022772 A1  Jan. 27, 2011

(30) Foreign Application Priority Data
Mar. 31, 2008 (DE) .................. 10 2008 018 256

(51) Int. Cl.
*G05B 11/01* (2006.01)
(52) U.S. Cl.
USPC ..................................... 340/12.32
(58) Field of Classification Search
USPC ................... 340/12.32, 12.39, 12.4, 3.8, 4.11
See application file for complete search history.

(56) References Cited

U.S. PATENT DOCUMENTS

| | | | |
|---|---|---|---|
| 5,237,305 A | 8/1993 | Ishikuro et al. | |
| 5,606,299 A | 2/1997 | Innes | |
| 7,061,143 B1 | 6/2006 | Kramer et al. | |
| 7,173,347 B2 * | 2/2007 | Tani et al. | 307/10.1 |
| 7,177,125 B2 * | 2/2007 | Lazarovich et al. | 361/42 |
| 7,479,858 B1 | 1/2009 | Baurand et al. | |
| 2006/0082979 A1 | 4/2006 | Brandl et al. | |
| 2007/0183102 A1 | 8/2007 | Seitz | |

FOREIGN PATENT DOCUMENTS

| | | |
|---|---|---|
| CN | 1378699 A | 11/2002 |
| CN | 1748275 A | 3/2006 |
| DE | 195 15 633 A1 | 10/1996 |
| EP | 0 488 178 A2 | 6/1992 |

(Continued)

OTHER PUBLICATIONS

Heinz Zipperer, ETZ, VDE Verlag GmbH, Berlin, DE, Bd. 120, Nr. 17, Sep. 1, 1999; Others; 1999; DE.

(Continued)

*Primary Examiner* — Vernal Brown
(74) *Attorney, Agent, or Firm* — Harness, Dickey & Pierce, P.L.C.

(57) ABSTRACT

A control module with connection devices for connection to connection terminals of a load feeder is disclosed. The control module may include a device interface for at least one connection, the interface being independent of the bus system, with a shut-off element able to be connected to the at least one connection device and with the load feeder able to be shut off by way of the shut-off element independently of the bus system. The control module may be plugged into connection terminals of the load feeder.

10 Claims, 2 Drawing Sheets

(56) References Cited

FOREIGN PATENT DOCUMENTS

| EP | 1 298 689 | A2 | 4/2003 |
| EP | 1 447 829 | A1 | 8/2004 |
| FR | 2 799 572 | A1 | 4/2001 |
| GB | 2 098 400 | A | 11/1982 |
| WO | WO 01/27955 | A1 | 4/2001 |
| WO | WO 2005/086311 | A1 | 9/2005 |

OTHER PUBLICATIONS

International Search Report.

* cited by examiner

CONTROL MODULE WITH CONNECTION DEVICES FOR CONNECTION TO CONNECTION TERMINALS OF A LOAD FEEDER AND LOAD FEEDER

PRIORITY STATEMENT

This application is the national phase under 35 U.S.C. §371 of PCT International Application No. PCT/EP2009/053305 which has an International filing date of Mar. 20, 2009, which designated the United States of America, and which claims priority on German patent application number DE 10 2008 018 256.7 filed Mar. 31, 2008, the entire contents of each of which are hereby incorporated herein by reference.

FIELD

At least one embodiment of the present invention generally relates to a control module with connecting devices for connection to connecting terminals of a load feeder, wherein the load feeder is connected to a bus system. At least one embodiment of the invention also generally relates to a load feeder for connection, disconnection and/or monitoring of a load, having first connection devices for connection of the load feeder to a bus system, second connection devices for connection of the load, and a control module.

BACKGROUND

Load feeders are switching device units which are normally arranged in a switchgear cabinet on a top-hat profile rail. In this case, a plurality of load feeders are generally attached alongside one another to a top-hat profile rail. The load feeders which are arranged in a switchgear cabinet are of modular design, in order to comply with the appropriate requirements. Load feeders such as these are intended to control and switch high currents and voltages in industrial installation technology. In particular, motors, such as polyphase motors, are operated by load feeders. In this case, the load feeder is also referred to as a motor starter.

Loads, in particular motors, which are connected and disconnected by load feeders, are often connected to a superordinate control system via a fieldbus. Nevertheless, it is frequently necessary for these loads or these motors to be selectively and safely disconnected independently of the superordinate control system. These requirements result from the safety analyses of a machine or installation, described, for example, in the international standards IEC 61508 and IEC 62061.

Safe disconnection of a load feeder which is connected via a bus system by way of a safety switching element, for example a limit switch, a ripcord or an emergency-stop button, can now be initiated only via the separate wiring of the auxiliary voltage via the break contacts of the safety switching element, see FIG. 1. In this case, the local safety switching element, also referred to as a disconnection element, is connected to external connecting terminals 2 of the load feeder 1, in which case the external connecting terminals 2 must be connected by a wire to a control module 3, and this is complex.

A further alternative is represented by safe controllers and safe bus systems, but these are in a very high price category.

SUMMARY

At least one embodiment of the invention includes disconnecting a load, which is connected to a load feeder, at low cost, safely and in a simple design manner, by way of a local disconnection element.

According to at least one embodiment of the invention, a control module is disclosed, and according to at least one embodiment of the invention, a load feeder is disclosed. Further features and details of the invention result from the dependent claims, the description and the drawings. Features and details which are described in conjunction with the control module in this case can also apply, of course, in conjunction with the load feeder, and in each case vice versa.

According to the first aspect of at least one embodiment of the invention, a control module includes connecting devices for connection to connecting terminals of a load feeder, wherein the load feeder is connected to a bus system, wherein the control module has an appliance interface which is independent of the bus system, for at least one connecting device, to which a disconnection element can be connected, via which the load feeder can be disconnected independently of the bus system.

In at least one embodiment of the invention, the wiring of the external connecting terminals on which the local disconnection element is arranged to a control module, as is required separately for the known load feeders, is now integrated in a control module. The control module is plugged onto connecting terminals of the load feeder. The control module has connecting means, in particular in the cover of the control module, to which a local disconnection element, for example a ripcord, a limit switch, an emergency-start button, etc., can be connected. The connecting means are arranged separately in the front area of the control module, and can therefore be connected independently of the supply voltage of the load feeder. Information relating to the state of the load feeder is in this case retained and, in addition, the information from the disconnection element which is connected via the connecting means can be evaluated in the control module.

The advantage of a control module such as this is that, on the one hand, the separate external connecting terminals which were previously required for the connection of the local connection element are no longer needed and, on the other hand, there is also no need for the wiring required for this purpose between the control module and the external connecting terminals.

Furthermore, one major advantage of the control module is the combination of the drive for the load feeder via a bus system or via a fieldbus of a bus system, and the drive of the local safety disconnection via a separate appliance interface, which is independent of the fieldbus. The safety disconnection can also be detected when the control module is in the disconnected state. The status of the safety disconnection, and of the appliance interface, that is to say of the load feeder, can always be monitored.

In addition, this results in a considerable saving in wiring since, despite the safety requirements, the fieldbus connection can be completed in a conventional manner, and safe disconnection can be achieved by the control module or by a disconnection element which is terminated at the appliance interface or at the at least one connecting device.

The at least one connecting device of the control module preferably has a plurality of outputs, with each output forming a specific connection option. Disconnection by way of the disconnection element acts only at the output to which the disconnection element is connected.

Furthermore, a control module is preferred in which the appliance interface has a communication interface for connection of at least one communication means. The information available relating to the load feeder can be transmitted continuously to a communication means via the communication interface.

The appliance interface, which is independent of the bus system, can be arranged on different sides of the control module. However, the appliance interface of the control module is preferably provided in the cover of the control module. In consequence, the appliance interface is easily accessible after the control module has been placed on the load feeder, and the connecting means and/or a disconnection element can easily be mounted on the appliance interface.

According to the second aspect of at least one embodiment of the invention, a load feeder is disclosed for connection, disconnection and/or monitoring of a load, having first connection devices for connection of the load feeder to a bus system, second connection devices for connection of the load, and a control module, in which the control module is plugged onto connecting terminals of the load feeder for connection to the load feeder and in which the control module has an appliance interface, which is independent of the bus system, for at least one connecting device, to which a disconnection element can be connected, via which the load feeder can be disconnected independently of the bus system.

A load feeder such as this makes it possible to disconnect a load that is connected to the load feeder cost-effectively, safely and with a simple design, by way of a local disconnection element.

The load feeder has first connecting devices for connection of the load feeder to a bus system, and second connecting devices for connection of the load. The control module of the load feeder is plugged onto connecting terminals of the load feeder. The essence of the load feeder is the specifically designed control module. The control module has an appliance interface, which is independent of the bus system, for a connecting means. A disconnection element, via which the load feeder can be disconnected independently of the bus system, can be connected to the connecting means. By way of example, a ripcord, a limit switch or an emergency-stop button can be provided as the disconnection element.

The load feeder has no external connecting terminals on which the local disconnection element would have to be arranged. This means that the separate external connecting terminals which were previously required for connection of the local connection element are not required, and there is also no need for the wiring that was required for this purpose between the control module and the external connecting terminals. The indirect connection of a local disconnection element to the control module can be implemented considerably more easily and quickly.

The otherwise separate wiring for the load feeder is integrated in the control module, which can be plugged onto the connecting terminals of the load feeder. The control module has connecting device(s), preferably in the cover, to which a local disconnection element can be connected. The connecting device(s), which are intended for safety disconnection and each output of which offers a dedicated connection option, are arranged separately in the front area of the control module, and can thus be connected independently of the supply voltage. In this case, disconnection acts only on the respective output. The information about the state of the load feeder is maintained by the disconnection element after the disconnection of the load, and the information of the disconnection element can additionally be evaluated in the control module. The available information can be transmitted continuously via communication device(s) which are connected to the appliance interface of the control module.

The load feeder allows local safety disconnection of a load via separate appliance interface, which is independent of the fieldbus, on the load feeder.

The major advantage of the load feeder is the capability to combine the drive via the bus system or via a fieldbus and the drive of the local safety disconnection via a separate appliance interface, which is independent of the fieldbus.

In addition, this results in a considerable wiring saving, since, despite the safety requirements, the fieldbus connection can be completed in the normal manner, and safe disconnection can be implemented by the control module or by a disconnection element which is terminated at the appliance interface or at the connecting device(s).

A load feeder is preferred which is characterized in that the control module is designed according to at least one embodiment of the first aspect of the invention.

This connection element of the load feeder may be a ripcord, a limit switch or an emergency-stop switch.

Furthermore, a load feeder is preferred in which the connecting device(s) are connected to the controller independently of the supply voltage for the load feeder.

Furthermore, a load feeder is preferred, in which the load feeder has a switching unit for connection and disconnection of the load, and/or a second switching unit with a short-circuit functionality and/or with an overload functionality.

By way of example, the load feeder can thus have a contactor for switching the load, in particular a motor. Furthermore, the load feeder can provide a circuit breaker which has a short-circuit functionality and an overload functionality.

BRIEF DESCRIPTION OF THE DRAWINGS

The invention will now be explained in more detail using example embodiments, which are not exclusive, and with reference to the attached drawings, in which.

DETAILED DESCRIPTION OF THE EXAMPLE EMBODIMENTS

Figure 1:
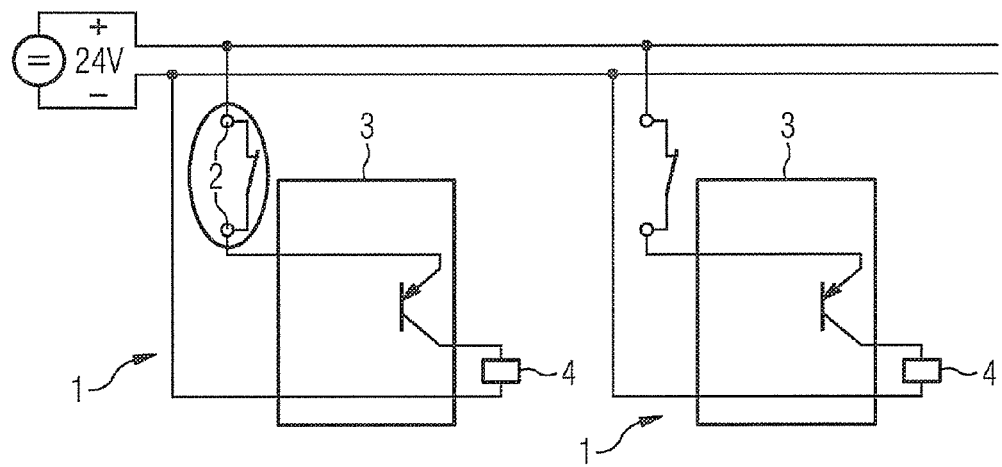
FIG. 1 shows a known load feeder with external connecting terminals for connection of a local disconnection element.

FIG. 1 shows two known load feeders 1 with external connecting terminals 2 for connection of a local disconnection element. The external connecting terminals 2 are connected by wires to the control module 3 in a complex manner.

Figure 2:
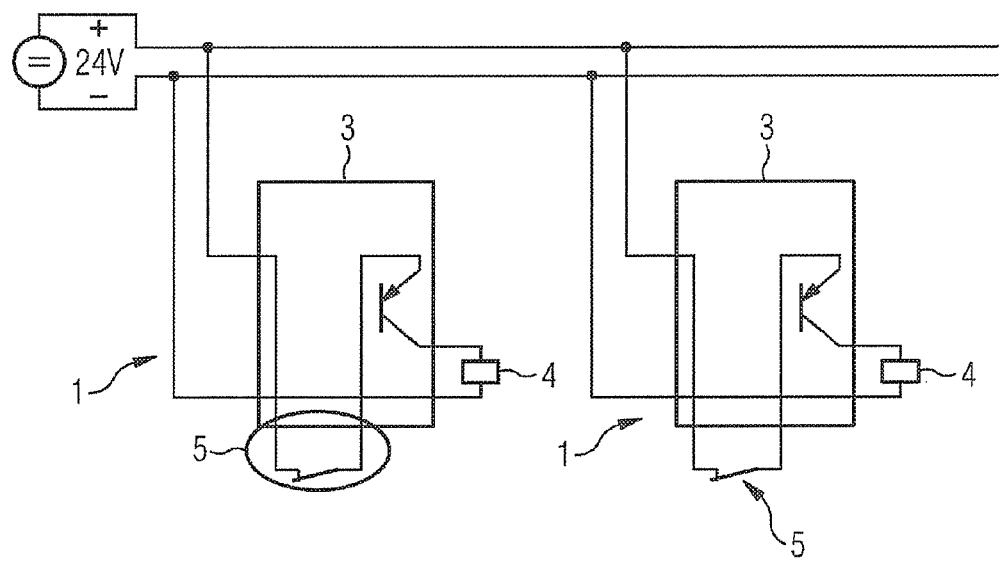
FIG. 2 shows a load feeder with a control module for connection of a local disconnection element.

FIG. 2 shows two load feeders 1, each having a control module 3 to which a local disconnection element can be connected via connecting device(s) 6, which are not illustrated, in order to selectively and safely disconnect the loads 4 which are connected to the load feeders 1. This means that the voltage or coil interruption is now possible directly at the control module 3.

Figure 3:
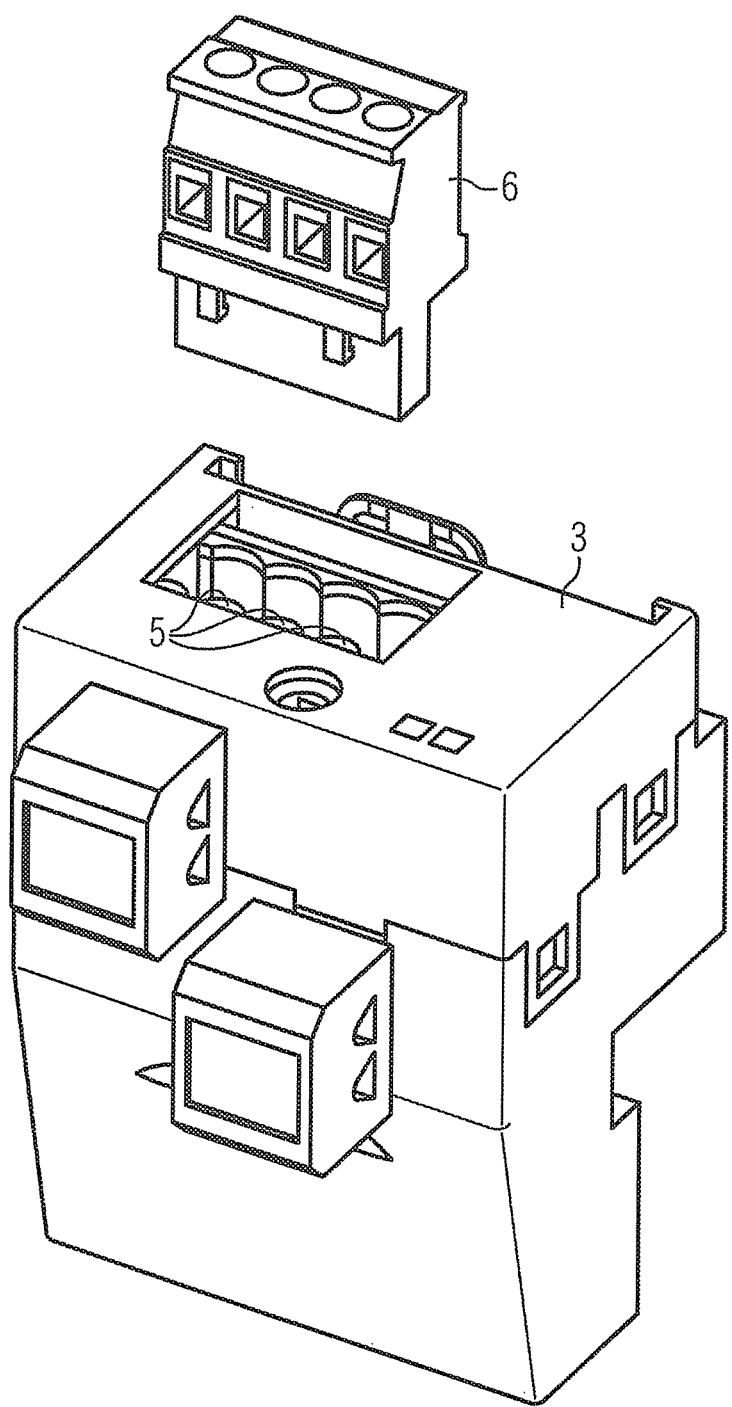
FIG. 3 shows a control module with an appliance interface and connecting device(s).

FIG. 3 shows one such control module 3. The control module 3 has, in particular in the cover of the control module 3, an appliance interface 5 which is independent of the bus system to which the load feeder 1 is connected. A connecting means 6 with one or more outputs can be connected to the appliance interface 5. A local disconnection element can be connected to one of the outputs of the connecting means 6, in order to disconnect the load 4 which is connected to this output.

A load feeder 1, as described above, represents a load feeder 1 with integrated safety technology.

A load feeder 1 to which a motor is connected combines the functions of a motor starter with those of an EMERGENCY-OFF circuit. By way of example, the motor is protected against overloading and short circuits by a circuit breaker, and the operator is protected by the EMERGENCY-OFF functionality of the local disconnection element.

It is also possible to use a plurality of load feeders designed in this way, jointly. These can then be operated in the form of a group circuit by one disconnection element, that is to say one EMERGENCY-OFF switch. The disconnection signal is then passed on from the first load feeder to the next load feeder.

The wiring complexity is avoided by the wiring integrated in the control module, thus leading to time and costsavings.

Example embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

The invention claimed is:

1. A control module including connecting devices for connection to connecting terminals of a load feeder, the load feeder being connectable by the control module to a bus system, the control module comprising:
   a housing;
   an appliance interface on an exterior surface of the housing, independent of the bus system, for at least one connecting element insertable into the appliance interface, to which a disconnection element internal to the housing is connectable, via which the load feeder is disconnectable independently of the bus system.

2. The control module as claimed in claim 1, wherein the at least one connecting element includes a plurality of outputs, each output forming a specific connection option.

3. The control module as claimed in claim 1, wherein the appliance interface includes a communication interface for connection of at least one communication device.

4. A load feeder for at least one of connection, disconnection and monitoring of a load, comprising:
   first connection devices for connection of the load feeder to a bus system;
   second connection devices for connection of the load; and
   a control module, configured to be plugged onto connecting terminals of the load feeder for connection to the load feeder, the control module including an appliance interface on a housing of the control module, independent of the bus system, for receiving at least one connecting element therein, to which a disconnection element in the housing is connectable, via which the load feeder is disconnectable independently of the bus system.

5. The load feeder as claimed in claim 4, wherein the disconnection element is a ripcord, a limit switch or an emergency-stop switch.

6. The load feeder as claimed in claim 4, wherein the at least one connecting element is connected to the control module independently of the supply voltage for the load feeder.

7. The load feeder as claimed in claim 4, wherein the load feeder includes at least one first switching unit for connection and disconnection of the load, and a second switching unit with at least one of a short-circuit functionality and an overload functionality.

8. The load feeder as claimed in claim 4, wherein the load is a motor.

9. The load feeder as claimed in claim 4, wherein the appliance interface includes a communication interface for connection of at least one communication device.

10. The load feeder as claimed in claim 4, wherein the appliance interface is provided in a cover of the control module.

* * * * *